Jan. 11, 1927. H. O. McMILLAN Re. 16,529

GAUGE DEVICE

Original Filed Dec. 11, 1922 2 Sheets-Sheet 1

INVENTOR
H. O. McMILLAN
BY HIS ATTORNEYS
Williamson Reif & Williamson

Jan. 11, 1927. H. O. McMILLAN Re. 16,529

GAUGE DEVICE

Original Filed Dec. 11, 1922 2 Sheets-Sheet 2

INVENTOR
H. O. McMILLAN
BY HIS ATTORNEYS
Williamson Rey & Williamson

Reissued Jan. 11, 1927.

Re. 16,529

UNITED STATES PATENT OFFICE.

HOWARD O. McMILLAN, OF MINNEAPOLIS, MINNESOTA.

GAUGE DEVICE.

Original No. 1,523,437, dated January 20, 1925, Serial No. 606,338, filed December 11, 1922. Application for reissue filed July 3, 1926. Serial No. 120,503.

This invention relates to a gauge device and particularly to such a device adapted for use in constructing a layer of material such as a layer of concrete. In constructing layers of concrete such as now commonly used in floors, roofs, pavements, etc., it is necessary to have gauges extending vertically to the form on which the layer is to be poured or extending vertically from the surface on which the layer is constructed. Plain wooden blocks or pieces of narrow board have heretofore been largely used for this purpose. It is difficult, however, to secure such pieces of block or board so that the same will not be toppled over in the pouring operation and they take up an objectionable amount of space and leave comparatively large area of wood exposed at the top and bottom of the layer.

It is an object of this invention, therefore, to provide a simple, inexpensive and efficient gauge device which can be readily secured in position and which is longitudinally adjustable to correctly determine the thickness of the layer.

It is also an object of the invention to provide such a gauge device comprising a base portion formed of sheet material in which is carried an adjustable wire or rod.

It is a further object of the invention to provide such a gauge device having a small flexible piece of wire projecting above said above mentioned wire or rod to form a flag by which the gauge device may be readily located if covered up.

It is a still further object of the invention to provide a bar adapted to be supported by the vertically adjustable member and to extend between two of such members, said bar forming a screed bar along which another member may be moved to level off the layer.

Another object of the invention is to provide such a device which may constitute a ceiling support disposed beneath a concrete floor.

These and other objects and advantages of the invention will be fully set forth in the following description made in connection with the accompanying drawings, in which like reference characters refer to the same parts throughout the different views, and in which, Fig. 1 is a view in vertical section through the concrete layer showing the gauge device in side elevation;

Figure 1:
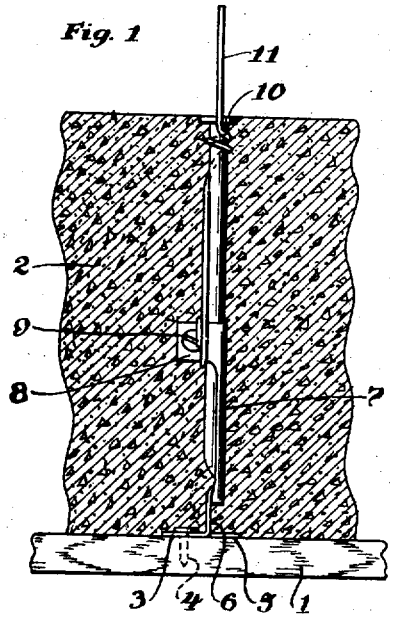
Figure 2:
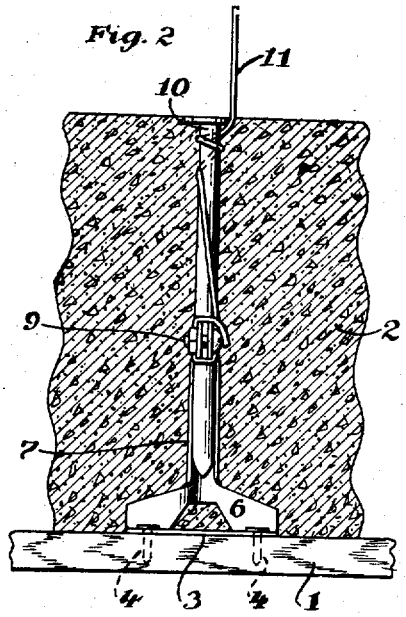
Fig. 2 is a similar view showing a gauge device in front elevation.

Referring to the drawings, in Figs. 1 and 2, the member 1 represents the bottom of a form or other enclosure which is to receive the layer 2 of material. The gauge device proper is supported upon the top surface of the member 1 and comprises a member made from a blank of sheet material preferably metal, which blank has one end extending forwardly to form a rectangular flange 3, which flange is provided with spaced holes adapted to receive small attaching tacks or nails 4 which will be received in the member 1. A trapezoidal portion of the blank is cut out on three sides immediately above the portion 3 and is bent rearwardly to form a flange portion 5. As shown in Figs. 1 and 2, the flanges 3 and 5 extend horizontally and the portion 6 immediately above the same is flat and extends vertically a short distance the top edges of said flat portion being inclined to the horizontal and converging upwardly. The blank is much narrower above the portion 6 and is formed into a semi-cylindrical or trough-shaped portion 7, the open side of which extends toward the direction of flange 3. The base flanges 3 and 5 are provided with an aperture, preferably circular, axially alined with the trough-shaped portion 7. At the upper end of the trough-shaped portion 7, the sides thereof are extended to form parallel lugs 8 and are apertured to receive a transversely extending nutted bolt 9 shown as having a grooved button head. A vertically extending wire or rod 10 is received in the trough-shaped portion 7 so as to be slidable therein and may be clamped in any desired position of adjustment by the bolt 9. As shown in Figs. 1 and 2, this member 10 may consist of an ordinary wire nail or spike. If, however, the layer is to be of such thickness that such a nail or spike of sufficient length is not available, a plain cut section of wire or small rod can be used.

The top of the member 10, as shown in Figs. 1 and 2, determines the top of the layer of material 2. In constructing such layers, however, the gauge devices are often covered up and it is necessary to know their location and to see the tops thereof in order to properly construct the layer. In order that the location of the gauge device may be readily discerned, a flat member is provided comprising a piece of small flexible wire 11 which, as shown, is merely lapped around the lugs 8 and turned one or more times about the top of the member 10 and then projects above the layer 2.

In operation, after the thickness of the layer has been determined, the workman takes a number of the gauge devices and adjusts the member 10 therein so as to give the proper length. This is conveniently done by merely placing the members between two boards which are spaced apart a distance equal to the thickness of the layer to be poured. The operator merely extends the members 10 until the flanges 3 and 5 touch one board and the end of the member 10 the other, and then quickly tightens the bolt 9 with a screw driver. The gauge members are then placed in properly spaced position, usually about four feet apart on the surface which is to receive the layer of material. The layer of material is then poured and leveled off in the usual manner so as to be flush with the top of the members 10. If the gauge devices are covered up their location will be indicated by the members 11 and it can thus be quickly ascertained whether the layer is properly leveled. After the layer is completed, and while the material is still soft, the ends of members 11 can be bent downward into the layer of material and will be covered by the grout and semi-liquid portions of the layer and thus concealed. The gauge devices remain permanently in the layer, take up small room therein, present a very small portion visible at the top and really act as a reinforcing means for the layer. The top of the gauge device which is exposed, is furthermore hard and will not wear down to form an objectionable hole in the layer. It will, of course, be understood that if the gauge device is to be used in a layer of street paving, the same will be placed upon top of the dirt or other layer which is to support the concrete.

Figure 3:
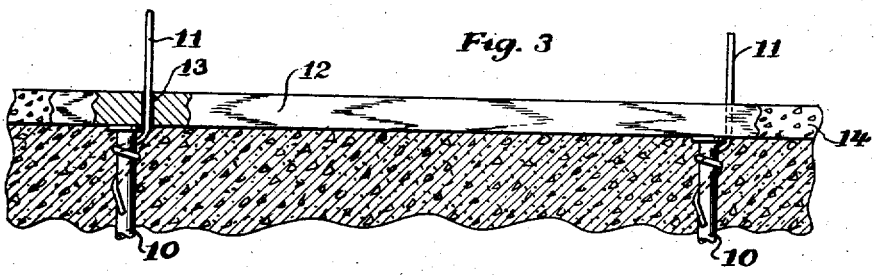
Fig. 3 is a vertical section through the top portion of a layer of concrete showing one form of bar used with the gauge device.

The members 10 are sometimes adjusted to be disposed some distance below the top of the layer, as shown in Fig. 3. In such use, a bar 12 is used having the small holes 13 therethrough through which the members 11 are adapted to project. The bar 12 thus rests on the top of members 10 and the layer of concrete 14 will extend to the top of the bars 12. The gauge devices are placed in position, as before described, and the bars 12 which are preferably tapered in cross section toward their lower edges, are placed thereon. The layer of concrete is then leveled off by drawing a bar along the top of the bars 12. After the layer is thus leveled the bars 12 are lifted and the small grooves formed thereby are either left in the layer or the same may be filled.

Figure 4:
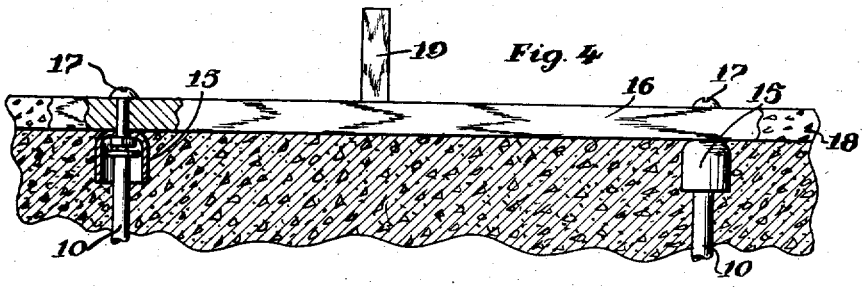
Fig. 4 is a view similar to Fig. 3, showing a modified form of bar used with the gauge device and also showing the bar used in leveling the layer.

In the form shown in Fig. 4, short open-ended cylinders or thimbles 15 are secured to one side of a bar 16 by small headed and nutted bolts 17. After the gauge devices are in place, the bar 16 is placed in position with the thimbles 15 surrounding the upper ends of the members 10, the bolts 17 resting on said members. The layers of material 18 can then be leveled by drawing the bar 19 along the tops of the bar 16 after which the bar 16 may be lifted and the spaces left thereby filled in, if desired.

Figure 5:
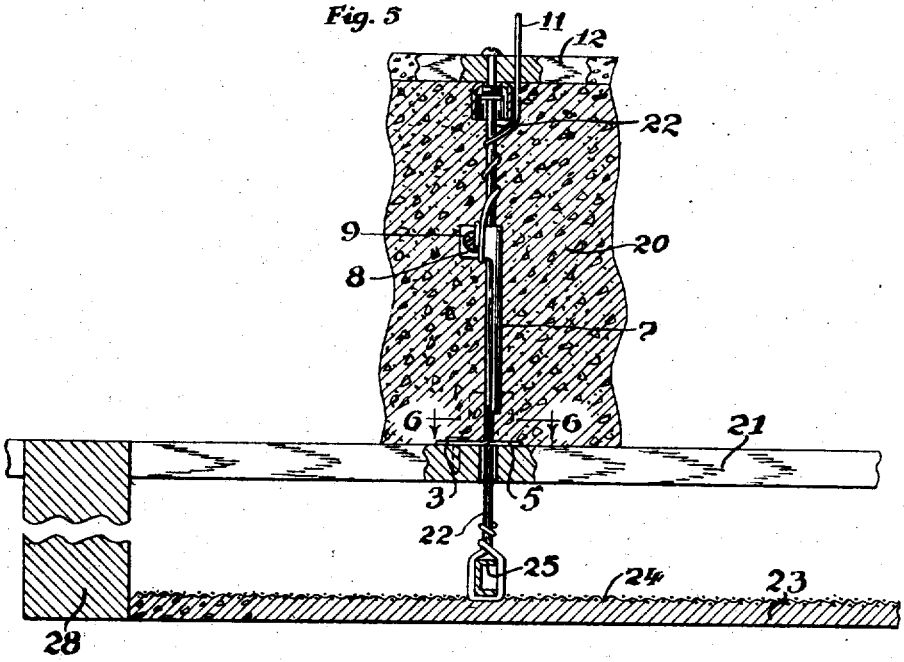
Fig. 5 is a vertical section through a concrete floor showing the gauge device used as a ceiling support.
Figure 6:
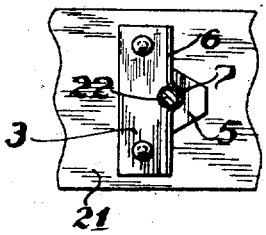
Fig. 6 is a horizontal section on line 6—6 of Fig. 5.

In Fig. 5 a portion of concrete floor is shown as 20 supported upon the member 21 constituting part of the form therefor. The gauge device shown in this figure is the same as that shown in Figs. 1 and 4 comprising the parts 3 to 9. The member 22 is used which replaces the member 10 and this member is shown as a wire or rod clamped in the extensions 8. Said wire or rod extends downwardly through the aperture in the base portions 3 and 5 and through an aperture in the member 21. The top of member 22 is embraced by thimbles 30 similar to thimbles 15 in Fig. 4 which are held in place on bar 12 by screws 29 similar to screws 17 in Fig. 4. When the floor 20 is formed, the lower end of the wire or rod 22 will merely hang down through the member 21. In such floor structure, beams 28 are often used which extend below the floor 20. It is frequently desired to build a ceiling layer 23 of concrete or other material in position to extend between the lower edges of the beams 28 so that a continuous surface of ceiling will be formed, thus concealing the spaced beams. One common form of such ceiling is shown in Fig. 5 and constitutes the layer of concrete 23 secured upon metal lath or fabric 24, which fabric is supported upon spaced members 25 commonly formed of small channel bars. These members 25 have hitherto commonly been supported by wires or other members embedded in the floor 20. With applicant's construction, the portion of the member 22 which was left hanging below the floor is used to support the members 25 and is simply bent around the same and twisted upon itself thereabove, as clearly shown in Fig. 5. It will be seen that as the floor 20 is in place and set, the form boards 21 can be removed from below, as the hanging lower ends of the members 22 will readily pass through the apertures in said boards. Fig. 6 clearly shows the aperture or hole through the base flanges 3 and 5 of the gauge device.

Figure 7:
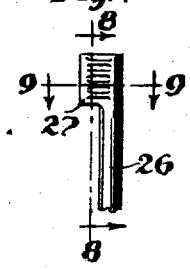
Fig. 7 is a side elevation of the top of a modified form of gauge device.
Figure 8:
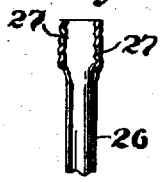
Fig. 8 is a vertical section on line 8—8 of Fig. 7.
Figure 9:
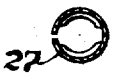
Fig. 9 is a vertical section on line 9—9 of Fig. 7.

A modified form of the gauge device is illustrated in the Figures 7 to 9. In this form, the gauge device is provided with a semi-cylindrical trough-shaped portion 26 of the same structure as the portion 7 shown in Figs. 1 and 2. The upper end of this portion is provided with forwardly extending portions 27 formed into substantially circular-shape as shown in Fig. 9 and provided with corrugations or roughened surfaces at their sides. With this structure, the member 10 or the member 22 will merely be pushed between the portions 27 and will frictionally be held in place. This structure, therefore, does not use the headed and nutted bolt 9 as the clamping means for holding such members in place.

From the above description, it is seen that applicant has provided an extremely simple and efficient gauge device and one which has a high degree of utility for the purpose intended. The device is easily and inexpensively made, the same being stamped out and bent in one operation into the form shown. The members 10 are, of course, easily secured at small expense. The parts being of metal the same will not soon decay and leave an objectionable hole in the layer of material. The device is quickly and easily adjusted and placed in position. The base portions 3 and 5 extend at each side of the device giving stability thereto and insure that the device will not be easily toppled over.

It will, of course, be understood, that various changes may be made in the form, details and proportions of the parts without departing from the scope of applicant's invention, which, generally stated, consists in the matter shown and described and set forth in the appended claims.

What is claimed is:—

1. A gauge device for a layer of material comprising a member having a flat base adapted to rest upon and be secured to a surface and having an upstanding portion adapted to embrace a wire or rod, and clamping means on said last named portion for holding said rod in various longitudinal positions.

2. The structure set forth in claim 1, and a bendable member projecting above said wire or rod.

3. A gauge device for a layer of material comprising a member made of sheet metal having a base flange and a vertical trough-shaped portion disposed above said flange, the sides of said trough-shaped portion having extensions adapted to constitute a clamping means, and a wire or rod disposed in said trough-shaped portion and adapted to extend adjacent the top of said layer.

4. A gauge device for a layer of material comprising forwardly and rearwardly extending base flanges, the flanges having apertures therethrough adapted to receive fastening means, a vertically extending semi-cylindrical portion disposed above said flanges and provided with forwardly extending lugs constituting a clamping means, and a vertical wire or rod disposed in said semi-cylindrical portion and extending adjacent the top of said layers.

5. A gauge device comprising a member made from a flat blank of sheet material and having a flat base portion, a vertical trough-shaped portion above said base portion, lugs extending from the edges of said trough-shaped portion, a screw passing through said lugs, a wire or rod disposed in said trough-shaped portion and clamped in adjusted position by said screw.

6. The structure set forth in claim 5, and a small flexible wire bent around said lugs and said wire or rod and projecting above the latter.

7. A gauge device comprising a plurality of spaced longitudinally adjustable gauge members, a bar supported on the tops of said gauge members and extending therebetween, and means movable along the top of said bar adapted to level off a layer of material.

8. The structure set forth in claim 3, said wire or rod having a portion extending below the base flange of said member to form a ceiling support.

9. A gauge device comprising a member made of one piece of sheet material having a base with oppositely disposed flanges adapted to be secured to a support and having an upwardly extending semi-cylindrical stem with projecting lugs at its upper end, said lugs being adapted to receive a clamping means, and a member adapted to be clamped in said stem and longitudinally adjustable therein.

10. A gauge device for a layer of material comprising a lower member adapted to seat on the supporting surface for a floor and having a clamping means thereon, and a wire or rod secured to said member by said clamping means and extending above the same, said wire or rod projecting below said member and adapted to carry a ceiling support.

11. The structure set forth in claim 9, and a bar resting upon said last mentioned member and having a cup-like member on its lower side embracing the top of said member.

12. A gauge device for a layer of material comprising a lower member having means adapted to rest on the supporting surface for said layer and be secured thereto, and an upper member for determining the top surface of said layer, said members having means thereon whereby they can be moved to various positions of relative longitudinal adjustment and retained in such positions.

13. A gauge device for a layer of material comprising a lower member having means adapted to rest on the supporting surface for said layer and be secured thereto, and an upper member for determining the top surface for said layer, said members having means thereon whereby they can be moved to various positions of relative longitudinal adjustment and held in such positions, said upper member having a head at its upper end and a flexible member wrapped around said upper member below said head and projecting above said head adapted to form a locating flat for said device.

14. A gauge device comprising a plurality of spaced longitudinally adjustable gauge members, a bar supported on the tops of said gauge members and extending therebetween, and means secured to said bar and embracing the tops of said gauge members to support said bar and prevent lateral movement thereof.

15. The structure set forth in claim 14, said last mentioned means comprising inverted cup-shaped members secured to and depending from the underside of said bar.

16. A gauge device for a layer of material comprising a member having a flat base adapted to rest upon and be secured to a surface and having an upstanding portion adapted to embrace and clamp a wire or rod, and a gauge including a wire or rod clamped in said portion and adapted to extend to the top of said layer or material.

17. A gauge device for concrete layers comprising a member having an upstanding portion and having means at its lower end for securing it to the supporting surface for said layer, a member slidably movable in engagement with said first mentioned member for determining the upper surface of said layer and means for holding said last mentioned member in fixed position relatively to said first mentioned member.

18. A gauge device for concrete layers comprising an upstanding member adapted to be supported on and secured to the supporting surface for said layer, a gauging member movable longitudinally of said first mentioned member and a clamping means comprising a member movable transversely of said first mentioned member for holding said gauge member in position relatively to said first mentioned member.

19. The structure set forth in claim 17, a bar supported by said second mentioned member and a levelling bar movable on said bar for levelling off the top of said layer.

20. A gauge device for a layer of material comprising a member having a standard, means at the lower end of said standard for securing it to the supporting surface for said layer, said standard having a surface engaging said supporting surface, a member movable to different positions along said standard for determining the upper surface for said layer and means for holding said last mentioned member in engagement with said standard in different positions thereon.

In testimony whereof I affix my signature.

HOWARD O. McMILLAN.